G. E. TRAUB.
INDEX FOR PRESSURE GAGES.
APPLICATION FILED DEC. 1, 1916.
1,226,828.
Patented May 22, 1917.
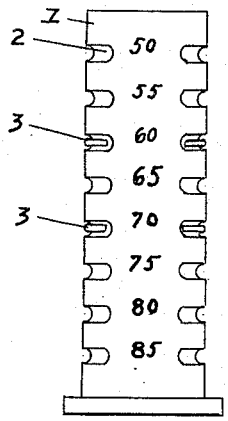
Fig. 1
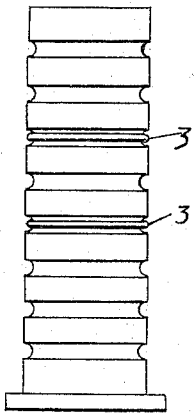
Fig. 2
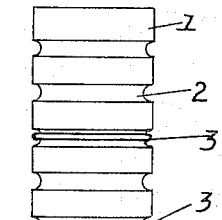
Fig. 3    Fig. 4
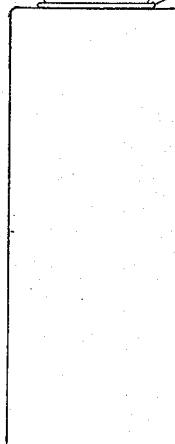
Fig. 7
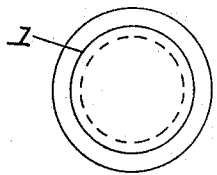
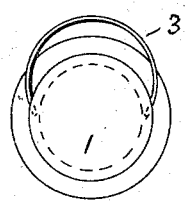
Fig. 6
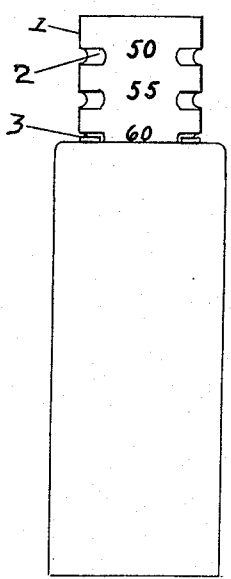
Fig. 5
INVENTOR
George E. Traub

UNITED STATES PATENT OFFICE.

GEORGE E. TRAUB, OF SAN DIEGO, CALIFORNIA.

INDEX FOR PRESSURE-GAGES.

1,226,828.  Specification of Letters Patent.  Patented May 22, 1917.

Application filed December 1, 1916. Serial No. 134,333.

*To all whom it may concern:*

Be it known that I, GEORGE E. TRAUB, a citizen of the United States, and a resident of San Diego, in the county of San Diego and State of California, have invented a new and useful Index for Pressure-Gages, of which the following is a specification.

My invention relates to cylindrical index members for use in tubular pressure gages for pneumatic tires and has for its objects the provision of such a member that may be adapted for various makes of said gages, so that a point on the member may be observed with a very small amount of light and which may be felt by the fingers if it is used in the dark.

With these and other objects in view the preferred form of the invention is shown in the accompanying drawings in which Figure 1 represents a front elevation of the invention; Fig. 2, a rear elevation; Fig. 3, a plan view of Fig. 1; Fig. 4, a plan view of one open ring; Fig. 6, a plan view showing an open ring partially in position; Fig. 5, a front elevation showing a gage of the tubular type showing 60 pounds as the indicated pressure; and Fig. 7, a rear elevation of Fig. 5 showing 70 pounds as the indicated pressure.

Similar reference characters refer to like parts throughout the several views.

The invention comprises a tube 1 having a series of graduations thereon and a series of grooves 2 extending from one side of said graduations around the back of said tube to the opposite side of said graduations but not across the figures; and one or more elastic metal open rings 3 adapted to fit into said grooves. It is intended to replace the graduated tube in gages using a graduated tube and in use it acts the same as the tube which it replaces but the presence of the rings in the grooves make the reading of a particular pressure more easily observed than if figures were relied on alone.

Suppose the desired pressure in the front tires of the automobile is 60 pounds and the desired pressure in the rear tires is 70 pounds: One ring 3 is slipped into the groove corresponding to 60 pounds and one ring into the groove corresponding to 70 pounds as shown in Fig. 1. When the gage is applied to the valve of the tire the tube 1 is forced upward in the ordinary manner and when the pressure of 60 pounds is reached the first ring is seen. If the ring is not observed the pressure is below 60 pounds. When the second ring appears the operator knows that 70 pounds pressure is reached but if only the first ring is seen the pressure is below 70 pounds. The open rings are removable and can be slipped into any groove desired. It is obvious that the grooves would be selected which correspond to the desired pressures.

I claim—

1. An index member for pressure indicators of the class described comprising a tube having graduations thereon and a series of horizontal grooves therein extending from one side of said graduations around said tube to the opposite side of said graduations but not across them; and removable elastic open rings in selected grooves of said series; for the purpose of facilitating the reading of said graduations.

2. An index member adapted for use in air pressure gages for pneumatic tires, comprising a tube having a series of grooves extending part way around the sides thereof and a series of figures between the ends of said grooves; and removable open rings disposed within grooves corresponding with selected figures indicating selected pressures; for the purpose of aiding in the reading of said selected pressures.

GEORGE E. TRAUB.

Copies of this patent may be obtained for five cents each, by addressing the "Commissioner of Patents, Washington, D. C."